3,301,750
BIS (SUBSTITUTED AMINO) N ALKYL DIPHENYL-
   AMINES AS FUNGICIDES AND ALGAECIDES
John A. Riddell, Hamden, and Edward L. Wheeler, Wood-
   bury, Conn., assignors to United States Rubber Com-
   pany, New York, N.Y., a corporation of New Jersey
   No Drawing. Filed July 16, 1964, Ser. No. 383,229
               12 Claims. (Cl. 167—30)

This invention relates to new and useful improvements in fungicides and algaecides.

We have found that certain bis(substituted amino) diphenylamines are effective fungicides and algaecides. These chemicals may be represented by the general formulae

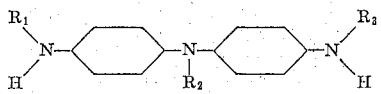

in which $R_1$ and $R_3$ are the same and are alkyl radicals having 1 to 8 carbon atoms or cyclohexyl and $R_2$ is methyl or ethyl, and

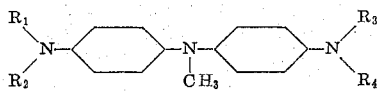

in which $R_1$, $R_2$, $R_3$ and $R_4$ are alkyl radicals having 1 to 8 carbon atoms or cyclohexyl.

The 4,4'-bis(monosubstituted amino) - N - substituted diphenylamines of the first general formula above may be prepared as described in the copending application of Edward L. Wheeler, U.S. application Serial No. 311,342, filed September 25, 1963.

The chemical 4,4' - bis(dimethylamino) - N - methyl diphenylamine may be prepared as described by O. Neunhoeffer and P. Heitman in Ber. 92, 245(1959).

The other 4,4'-bis(disubstituted amino)-N-methyl diphenylamines of the second general formula above may be prepared as described in the copending application of Edward L. Wheeler, U.S. application Serial No. 311,338, filed September 25, 1963.

The chemicals of the present invention may be applied to plants, which term includes various plants parts such as seeds, flowers, fruits, vegetables, roots and foliage, as a liquid or spray in a liquid carrier such as an organic solvent or water, or may be applied as a dust in admixture with a powdered solid carrier such as the various mineral silicates, e.g. mica, talc, pyrophillite, and clays. The chemicals of the invention may be applied in admixture with surface-active agents which may be anionic, nonionic or cationic surface-active agents, and which act as wetting agents for the chemicals. Such surface-active agents are well known and reference is made to U.S. Patent No. 2,547,724, columns 3 and 4 for detailed examples of the same. The chemicals of the invention may be admixed with powdered solid carriers, such as mineral silicates, together with a surface-active agent so that a wettable powder may be obtained which may be applied directly to plants, or which may be shaken up with water for application to the plants in that form. As algaecides, the chemicals of the invention may be applied to the algae by adding the chemical to the water in amount to give the desired concentration in the water that will kill the desired proportion of algae existing in the water.

The following examples illustrate the invention. All parts referred to herein are by weight.

Example 1

This example evaluates the chemicals of the present invention as protectant fungicides by their ability to protect plants from subsequent infection of fungus diseases.

One gram of each chemical to be tested was ground with three ml. of acetone and 50 mg. of a non-ionic surface-active agent (a condensation product of an alkyl phenol and ethylene oxide). The acetone and surface-active agent are known to be inactive in the biological tests run. The mixture was diluted to 500 ml. with water, giving suspensions containing 2000 p.p.m. (parts per million) of the chemical. These suspensions were sprayed on duplicate six inch tomato plants (variety Clark's Early Special) using a gun-type sprayer which delivered 2.5 ml. per second. The plants were then placed in the greenhouse, together with untreated check plants. Twenty-four hours later the treated plants and the untreated check plants were inoculated with a suspension of *Alternaria solani* spores by means of a 20 second spray from an atomizer sprayer (delivery rate 1 ml. per second). The plants were then kept overnight in a control chamber at a temperature of 75° F. and 100% relative humidity. In the morning the plants were transferred to the greenhouse. Three days later the disease was scored by comparing the number of disease lesions of the treated plants with the untreated check plants.

The formula to determine percent disease control is:

$$100 - \frac{\text{(Ave. No. lesions on treated plant)}}{\text{(Ave. No. lesions on untreated plant)}} \times 100 = \text{percent control}$$

The results of the tests are shown in the following table.

Chemical: Percent control
4,4' - bis(methylamino) - N - methyldiphenyl-
   amine _____ 99.8
4,4' - bis(isopropylamino) - N - methyldiphen-
   ylamine _____ 93
4,4' - bis(isopropylamino) - N - ethyldiphen-
   ylamine _____ 100
4,4' - bis(sec. - butylamino) - N - methyldi-
   phenylamine _____ 97
4,4' - bis(1,3 - dimethylbutylamino) - N - meth-
   yldiphenylamine _____ 55
4,4' - bis(2 - octylamino) - N - methyldiphen-
   ylamine _____ 95
4,4' - bis(cyclohexylamino) - N - methyldiphen-
   ylamine _____ 67
4,4' - bis(dimethylamino) - N - methyldiphen-
   ylamine _____ 99
4,4' - bis(N - methyl - N - isopropylamino)-
   N-methyldiphenylamine _____ 90

Example 2

Various chemicals of the present invention were tested for systemic fungicidal activity by the procedure described below. Many commonly used protective fungicides are effective protectants against bean rust if applied before infection takes place, but are ineffective if applied after the organism has established itself within the plant tissue. Only a chemical capable of entering the plant is effective under these conditions. A fungicide absorbed and translocated to all parts of a plant would overcome several disadvantages of standard protectant fungicides. It would be less subject to loss by wash off and weathering. It would protect plant growth made after chemical application, and would protect against absorption, e.g. seed and soil-borne diseases. The timing of application would be less important and less frequent treatments would be satisfactory. The following procedure was used to test various chemicals of the present invention as systemic fungicides.

Urediospores or summer spores of *Uromyces phaseoli* var. *typica* Arth. were collected from previously inoculated untreated plants by brushing the spores into a vial. At suspension of 35 mg. of spores in a liter of water containing 125 p.p.m. of Ivory soap (sodium salt or higher fatty acids) was sprayed to run-off on the expanding primary leaves of ten-day-old Pinto bean plants. The infected plants were placed in a continual mist humidity chamber at 75° F. for 24 hours, then in the greenhouse for an additional 24 hours. At this time the organisms were established within the plant tissues and are not affected by the usual protectant fungicides.

The chemicals to be tested were prepared as in Example 1. Spray solutions containing 2000 p.p.m. of the chemicals to be tested were sprayed to run-off on infected plants. Thus treated plants and untreated infected plants were held overnight at 70 to 75° F. and 95 to 100% relative humidity, then allowed to dry in the shade before being placed in the greenhouse. In 8 to 10 days the sori or brown pustules appeared on the upper and lower leaf surfaces of untreated plants. The number of pustules on the treated plants as compared to the number of pustules on the untreated plants is an index of the activity of the chemical tested. Such data, expressed as percent disease control by a formula similar to that used in Example 1, are shown in the following table.

Chemical: Percent control
  4,4' - bis(isopropylamino) - N - methyldiphenylamine _____ 100
  4,4' - bis(dimethylamino) - N - methyldiphenylamine _____ 100

The chemicals showed no phytotoxicity. By comparison in the same test, 4,4'-bis(dimethylamino) diphenylamine also showed 100% disease control but was 83% phytotoxic, and thus of no value as a fungicide. It would appear that the middle nitrogen i.e. the nitrogen attached to the two phenylene groups, must be a tertiary nitrogen to make the chemical safe and obviate the extreme phytotoxicity of the analogous chemical where the middle nitrogen is a secondary nitrogen, i.e. attached to hydrogen.

*Example 3*

This example illustrates the effectiveness of chemicals of the present invention as algaecides.

Aqueous suspensions of the chemicals were prepared by mixing 50 mg. of the chemical under test in 3 ml. of acetone and diluting with 47 ml. of water. Four milliliters or two milliliters of the suspension of the chemical were pipetted into 200 ml. of an algae culture contained in a 250 ml. flask, giving a concentration of the chemical of approximately 20 or 10 p.p.m., respectively. The algae culture contained the following algae: *Ankistrodemus falcatus* (blue-green algae), Oscillatoria spp. (blue-green algae), Chlorella (green algae), Lepodinclis spp. (flagellate), and diatoms.

The effectiveness of the various chemicals as algaecides was determined two weeks after treatment by estimating the percent kill by usual observation compared to untreated check flasks. The results are shown in the following table:

| Chemical | Percent Kill at— | |
|---|---|---|
| | 20 p.p.m. | 10 p.p.m. |
| 4,4'-bis(methylamino)-N-methyldiphenylamine | 100 | |
| 4,4'-bis(isopropylamino)-N-methyldiphenylamine | | 98 |
| 4,4'-bis(isopropylamino)-N-ethyldiphenylamine | | 70 |
| 4,4'-bis(sec.-butylamino)-N-methyldiphenylamine | 100 | |
| 4,4'-bis(dimethylamino)-N-methyldiphenylamine | | 90 |
| 4,4'-bis(N-methyl-N-isopropylamino)-N-methyldiphenylamine | | 90 |
| 4,4'-bis(N-methyl-N-cyclohexylamine)-N-methyldiphenylamine | | 90 |

Having thus defined our invention, what we claim and desire to protect by Letters Patent is:

1. The method of controlling fungi on plants which comprises applying to plants a fungicidal effective amount of a chemical having a formula selected from the group consisting of

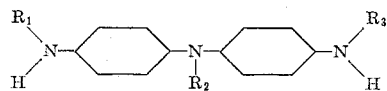

in which R and R₃ are the same and are selected from the group consisting of alkyl radicals having 1 to 8 carbon atoms and cyclohexyl and R₂ is an alkyl radical having 1 to 2 carbon atoms, and

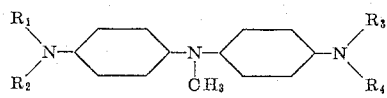

in which $R_1$, $R_2$, $R_3$ and $R_4$ are selected from the group consisting of alkyl radicals having 1 to 8 carbon atoms and cyclohexyl.

2. The method of controlling fungi on plants which comprises applying a fungicidal effective amount of 4,4'-bis(methylamino)-N-methyldiphenylamine to plants.

3. The method of controlling fungi on plants which comprises applying a fungicidal effective amount of 4,4'-bis(isopropylamino)-N-methyldiphenylamine to plants.

4. The method of controlling fungi on plants which comprises applying a fungicidal effective amount of 4,4'-bis(sec.-butylamino)-N-methyldiphenylamine to plants.

5. The method of controlling fungi on plants which comprises applying a fungicidal effective amount of 4,4'-bis(dimethylamino)-N-methyldiphenylamine to plants.

6. The method of controlling fungi on plants which comprises applying a fungicidal effective amount of 4,4'-bis(N - methyl - N - isopropylamino)-N-methyldiphenylamine to plants.

7. The method of killing algae in water which comprises adding to said water an algaecidal effective amount of a chemical having a formula selected from the group consisting of

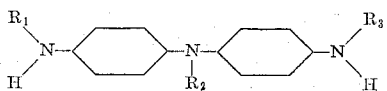

in which $R_1$ and $R_3$ are the same and are selected from the group consisting of alkyl radicals having 1 to 8 carbon atoms and cyclohexyl and $R_2$ is an alkyl radical having 1 to 2 carbon atoms, and

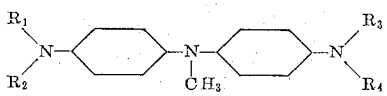

in which $R_1$, $R_2$, $R_3$ and $R_4$ are selected from the group consisting of alkyl radicals having 1 to 8 carbon atoms and cyclohexyl.

8. The method of killing algae in water which comprises adding an algaecidal effective amount of 4,4'-bis(methylamino)-N-methyldiphenylamine to said water.

9. The method of killing algae in water which comprises adding an alkaecidal effective amount of 4,4'-bis(isopropylamino) - N - methyldiphenylamine to said water.

10. The method of killing algae in water which comprises adding an algaecidal effective amount of 4,4'-bis(sec.-butylamino) - N - methyldiphenylamine to said water.

11. The method of killing algae in water which comprises adding an algaecidal effective amount of 4,4'-bis(dimethylamino) - N - methyldiphenylamine to said water.

12. The method of killing algae in water which comprises adding an algaecidal effective amount of 4,4'-bis(N - methyl-N-isopropylamino) - N - methyldiphenylamine to said water.

(References on following page)

References Cited by the Examiner

UNITED STATES PATENTS 2,290,860  7/1942  Burk _____ 260—576

FOREIGN PATENTS 705,923  5/1941  Germany.

OTHER REFERENCES

Newnhoeffer et al.: "Berichte," vol. 92, pages 248 and 250 (1959).

JULIAN S. LEVITT, *Primary Examiner.*

J. D. GOLDBERG, *Assistant Examiner.*